United States Patent
Ogino et al.

(10) Patent No.: US 7,353,032 B2
(45) Date of Patent: *Apr. 1, 2008

(54) METHOD, SYSTEM, AND APPARATUS FOR DETECTING A POSITION OF A TERMINAL IN A NETWORK

(75) Inventors: Atsushi Ogino, Kodaira (JP); Takashi Yano, Tokorozawa (JP); Katsuhiko Tsunehara, Hachiouji (JP); Ryota Yamasaki, Kokubunji (JP); Masaaki Shida, Hachiouji (JP); Hideya Suzuki, Ichikawa (JP); Nobukazu Doi, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/633,127

(22) Filed: Dec. 4, 2006

(65) Prior Publication Data

US 2007/0087760 A1   Apr. 19, 2007

Related U.S. Application Data

(63) Continuation of application No. 10/463,608, filed on Jun. 18, 2003, now Pat. No. 7,167,712.

(30) Foreign Application Priority Data

Sep. 6, 2002   (JP) .............................. 2002-260772

(51) Int. Cl.
*H04Q 7/20* (2006.01)
(52) U.S. Cl. ................ 455/456.1; 455/434; 455/435.1; 455/433; 455/414.2; 455/436; 370/320; 370/315; 370/395.62; 370/338; 370/335

(58) Field of Classification Search ................ 455/440, 455/456.1, 456.2, 18, 522, 434, 435, 435.1, 455/433, 436, 414.2; 370/338, 335, 320, 370/315, 395.62
See application file for complete search history.

(56) References Cited

U.S. PATENT DOCUMENTS 6,108,553 A   8/2000   Silventoinen et al.

(Continued)

FOREIGN PATENT DOCUMENTS

JP   01-235881   2/1989

(Continued)

OTHER PUBLICATIONS

Xinrong, Li et al., "Comparison of Indoor Geolocation Methods in DSSS and OFDM Wireless LAN Systems", VTC, 2000, pp. 3015-3020.

(Continued)

*Primary Examiner*—Joseph Feild
*Assistant Examiner*—Randy Peaches
(74) *Attorney, Agent, or Firm*—Reed Smith LLP; Stanley P. Fisher, Esq.; Juan Carlos A. Marquez, Esq.

(57) ABSTRACT

A method, system, and apparatus are provided for detecting a position of a terminal in a network accurately without a GPS receiver. In one example, a method for locating a position of a terminal includes calculating a position of a base station; detecting a clock time difference between the base station and another base station; measuring a reception timing of a signal received by the base station from the terminal; and locating the position of the terminal using at least the position of the base station, the clock time difference, and the reception timing.

7 Claims, 9 Drawing Sheets

U.S. PATENT DOCUMENTS

| | | |
|---|---|---|
| 6,748,213 B1 | 6/2004 | Kim |
| 7,167,712 B2 * | 1/2007 | Ogino et al. ............. 455/456.1 |
| 2002/0080759 A1 | 6/2002 | Harrington et al. |
| 2004/0235472 A1 | 11/2004 | Fujishima |

FOREIGN PATENT DOCUMENTS

| | | |
|---|---|---|
| JP | 05-506505 | 3/1991 |
| JP | 06-186316 | 6/1992 |
| JP | 07-181242 | 12/1993 |
| JP | 08-146110 | 11/1994 |
| JP | 2000-156882 | 11/1998 |
| JP | 2001-264090 | 3/2000 |
| JP | 2002-014152 | 6/2000 |
| JP | 2002-236163 | 2/2001 |
| WO | WO 97/23785 | 12/1996 |
| WO | WO 98/52376 | 5/1997 |
| WO | WO 01/15340 A1 | 8/2000 |
| WO | WO 02/41504 | 11/2001 |
| WO | WO 02/41504 A2 | 11/2001 |
| WO | WO 02/41504 A2 * | 5/2002 |

OTHER PUBLICATIONS

Japanese Office Action mailed Jan. 10, 2006.

* cited by examiner

FIG. 7

| ID NUMBER | POSITION | FREQUENCY CHANNEL NUMBER | SENDING DELAY TIME | RECEIVING DELAY TIME |

| BASE STATION INFORMATION 1 | BASE STATION INFORMATION 2 | BASE STATION INFORMATION 3 | ... | BASE STATION INFORMATION n |

METHOD, SYSTEM, AND APPARATUS FOR DETECTING A POSITION OF A TERMINAL IN A NETWORK

CROSS-REFERENCE TO RELATED APPLICATION

This application is a Continuation application of U.S. application Ser. No. 10/463,608 filed Jun. 18, 2003 now U.S. Pat. No. 7,167,612. Priority is claimed based on U.S. application Ser. No. 10/463,608 filed Jun. 18, 2003, which claims the priority of Japanese Patent Application No. 2002-2607722 filed on Sep. 6, 2002, all of which is incorporated by reference.

BACKGROUND OF THE INVENTION

1. Field of the Invention

The present invention generally relates to a position locating method employed for wireless communications and, more particularly, to a position locating method for wireless local area network (LAN) systems.

2. Discussion of Background

The wireless LAN defined typically by the IEEE802.11 Standard is now employed widely in offices and public spaces such as hot spots due to its properties of compatibility with the Internet and fast data transfer with wide-ranged wireless media (semi-micro waves, semi-millimeter waves, infrared rays). In the wireless LAN, for example, JP-A No.264090/2001 discloses various positional information services such as "navigation services", "town guide information services", supplied in accordance with the positional information of terminals.

On the other hand, JP-A No.156882/2000 discloses a method for locating positions of each terminal using global position system technology (GPS) and the self-station identity (CS-ID) of each base station. In the former method, while a terminal position is located within an accuracy of about 10 meters, the subject terminal is required to have a GPS receiver. In the latter method, while there is no need to provide the terminal with a GPS receiver, the position locating accuracy is just about a distance between base stations, since the terminal position locating is done according to the CS-ID of the nearest base station when the terminal's receiving power is the maximum. In this case, the terminal will be difficult to receive such services as the "navigation services", which requires a certain level of accuracy.

SUMMARY OF THE INVENTION

Under the circumstances, the present invention aims to provide a method for locating positions of a terminal of a wireless LAN system accurately without providing the terminal with a GPS receiver.

In order to achieve the object, one aspect of the invention resides in a wireless communication system where each base station detects a clock time difference between base stations through mutual wireless communication and measure a receiving time of each base station with respect to a signal received from the terminal, and then locates the terminal position according to the detected clock time difference, the measured receiving time, and the position of each base station.

Concretely, the wireless communication system of the invention comprises: a first base station having a first clock and known coordinates; a second base station having a second clock and known coordinates; and a terminal. Each of the first and second base stations measures its receiving time of a first signal received from the terminal using its own clock while the second base station also measures its receiving time of a second signal received from the first base station using the second clock. The system then detects a time difference between the first and second clocks according to the coordinates of the first and second base stations, the transmission timing of the second signal measured by the first clock, and the receiving time of the second signal measured by the second clock, and then locates the position of the terminal according to the receiving time of the first signal measured by the first clock, the receiving time of the first signal measured by the second clock, and the detected time difference.

In another aspect, the wireless communication system of the invention further comprises a third base station having a third clock and known coordinates, wherein: the third base station measures a receiving time of a first signal received from the terminal using the third clock; and the system detects a time difference between the first and third clocks according to the coordinates of the first and third base stations, the transmission timing of the second signal measured by the first clock, and the receiving time of the second signal measured by the third clock, and then locates the position of the terminal according to the receiving time of the first signal measured by the first clock, the receiving time of the first signal measured by the second clock, the receiving time of the first signal measured by the third clock, and the detected time difference.

Preferably, the system may be controlled such that the same communication channel is used among those first to third base stations before the position locating.

In another aspect, the wireless communication system of the invention comprises a plurality of base stations, a plurality of communication channels, and a terminal, wherein: the system sets a common communication channel at least for a first base station having a first clock and known coordinates, a second base station having a second clock and known coordinates, and a third base station having a third clock and known coordinates, the first to third base stations are included in the plurality of base stations mentioned above; each of the first to third base stations has a first measuring block for measuring a receiving time of a first signal received from the terminal using its own clock while each of the second and third base stations has a second measuring block for measuring a receiving time of a second signal received from the first base station using its own clock; and then the system locates the position of the terminal according to the coordinates of the first to third base stations, the transmission timing of the second signal measured by the first clock, the receiving time of the second signal measured by the second clock, the receiving time of the second signal measured by the third clock, the receiving time of the first signal measured by the first clock, the receiving time of the first signal measured by the second clock, and the receiving time of the first signal measured by the third clock.

At this time, the transmission power may be controlled in the base stations other than those for which a common communication channel is set if they use the same communication channel.

In another aspect, the invention resides in a server for the wireless communication system comprising a plurality of base stations, a plurality of communication channels, and a terminal, wherein among the plurality of base stations in the system, each of the first base station having a first clock and known coordinates, the second base station having a second clock and known coordinates, and the third base station having a third clock and known coordinates measures its receiving time of a first signal received from the terminal using its own clock while each of the second and third base stations measures its receiving time of a second signal received from the first base station using its own clock; and wherein the server sets a common communication channel for the first to third base stations, and then locates the position of the terminal according to the coordinates of the first to third base stations, the transmission timing of the second signal measured by the first clock, the receiving time of the second signal measured by the second clock, the receiving time of the second signal measured by the third clock, the receiving time of the first signal measured by the first clock, the receiving time of the first signal measured by the second clock, the receiving time of the first signal measured by the third clock.

While a description has been made for measurement of a signal transmission timing, the inventions may be modified such that measurement of the signal transmission timing is not performed. That is, another aspect of the invention resides in the wireless communication system which comprises a first base station having known coordinates, a second base station having a second clock and known coordinates, a third base station having a third clock and known coordinates, and a terminal, wherein: each of the second and third base stations measures its receiving time of a first signal received from the terminal using its own clock while each of the second and third base stations measures its receiving time of the second signal received from the first base station using its own clock; and the system detects a time difference between the second and third clocks according to the coordinates of the first to third base stations, the receiving time of the second signal measured by the second clock, the receiving time of the second signal measured by the third clock; and then the system locates the position of the terminal according to the receiving time of the first signal measured by the second clock, the receiving time of the first signal measured by the third clock, and the detected time difference.

Further, the invention may be modified such that: the wireless communication system includes a fourth base station having a fourth clock and known coordinates; allows the fourth base station to measure its receiving time of the first signal received from the terminal using the fourth clock; detects a time difference between the second and fourth clocks according to the coordinates of the first, second, and fourth base stations, the receiving time of the second signal measured by the second clock, the receiving time of the second signal measured by the fourth clock; and then locates the position of the terminal according to the receiving time of the first signal measured by the second clock, the receiving time of the first signal measured by the third clock, the receiving time of the first signal measured by the fourth clock, and the detected time difference.

Further, the invention may be modified such that the system controls the first to fourth base stations in the position locating such that the same communication channel is used for all of those first to fourth base stations.

In another aspect, the invention resides in a server that locates a position of a terminal according to a receiving time of a signal received at each base station from another base station through mutual communication, a receiving time of a signal from the terminal at each base station, and a position of each base station.

In another aspect, the invention resides in a server that locates a position of a terminal according to a signal received at each base station from another base station through mutual communication and a receiving time of the signal, a signal received at each base station from the terminal and the receiving time of the signal, and a position of each base station.

Further, the invention may be modified such that the server stores a delay time in the receiving processing at each base station and uses the delay time to locate the position of the terminal.

Further, the invention may be modified such that the server decides both base station and frequency channel used to locate the position of the terminal according to the position of the base station that transfers the position locating request issued from the terminal. At this time, the server may control the transmission power in the frequency channel of each base station that is not used for the position locating, according to both of the base station and its frequency channel used for locating the position of the terminal.

In another aspect, the invention resides in the base station which comprises a communication block, a storage block, a clock, a processing block, and a local area network interface (LAN I/F) block, wherein the base station identifies the receiving time of each wireless packet according to the baseband signal (I/Q) stored in the storage block and the storing operation time.

Further, the invention may be modified such that the receiving time of the wireless packet is identified according to the cross-correlation between a received baseband signal (I/Q) stored in the storage block and a predetermined complex signal vector, as well as the storing operation time.

In another aspect, the invention resides in an inter-base-station synchronizing method that allows the base stations in a wireless LAN system to synchronize with each other by detecting a clock time difference among those base stations through mutual wireless communication. At this time, each base station in the wireless LAN system may repeat the mutual wireless communication by a plurality of times to detect its clock time difference rate per unit time from others so that the base stations synchronize with each other.

In another aspect, the invention resides in a wireless communication system which comprises a plurality of base stations, a plurality of communication channels, and a terminal; wherein the system sets a common communication channel for at least a first base station having known coordinates, a second base station having a second clock and known coordinates, a third base station having a third clock and known coordinates, and a fourth base station having a fourth clock and known coordinates, the first to fourth base stations being included in the plurality of base stations; wherein each of the second to fourth base stations has a first measuring block for measuring a receiving time of a first signal received from the terminal using its own clock; wherein each of the second to fourth base stations has a second measuring block for measuring a receiving time of a second signal received from the first base station using its own clock; and wherein the system locates the position of the terminal according to the coordinates of the first to fourth base stations, the receiving time of the second signal measured by the second clock, the receiving time of the second signal measured by the third clock, the receiving time of the second signal measured by the fourth clock, the receiving time of the first signal measured by the second clock, the receiving time of the first signal measured by the third clock, and the receiving time of the first signal measured by the fourth clock. At this time, the transmission power in the base stations other than those for which the common communication channel is set may be controlled if they use the same communication channel.

In another aspect, the invention resides in a server for a wireless communication system comprising a plurality of base stations, a plurality of communication channels, and a terminal; wherein among the plurality of base stations in the system, the first base station having known coordinates, the second base station having a second clock and known coordinates, the third base station having a third clock and known coordinates, and the fourth base station having a fourth clock and known coordinates measure their receiving times of a first signal received from the terminal using their own clocks while the second to fourth base stations measure their receiving times of a second signal received from the first base station using their own clocks; wherein the server sets a common communication channel for the first to fourth base stations and locates the position of the terminal according to the coordinates of the first to fourth base stations, the receiving time of the second signal measured by the second clock, the receiving time of the second signal measured by the third clock, the receiving time of the second signal measured by the fourth clock, the receiving time of the first signal measured by the second clock, the receiving time of the first signal measured by the third clock, and the receiving time of the first signal measured by the fourth clock.

The invention encompasses other embodiments of a system, a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 7 is a data format of base station information to be stored in a server according to the invention;

DESCRIPTION OF THE PREFERRED EMBODIMENTS

An invention for a method, system, and apparatus for detecting a position of a terminal in a network accurately without a GPS receiver is disclosed. Numerous specific details are set forth in order to provide a thorough understanding of the present invention. It will be understood, however, to one skilled in the art, that the present invention may be practiced without some or without all of these specific details.

Figure 1:
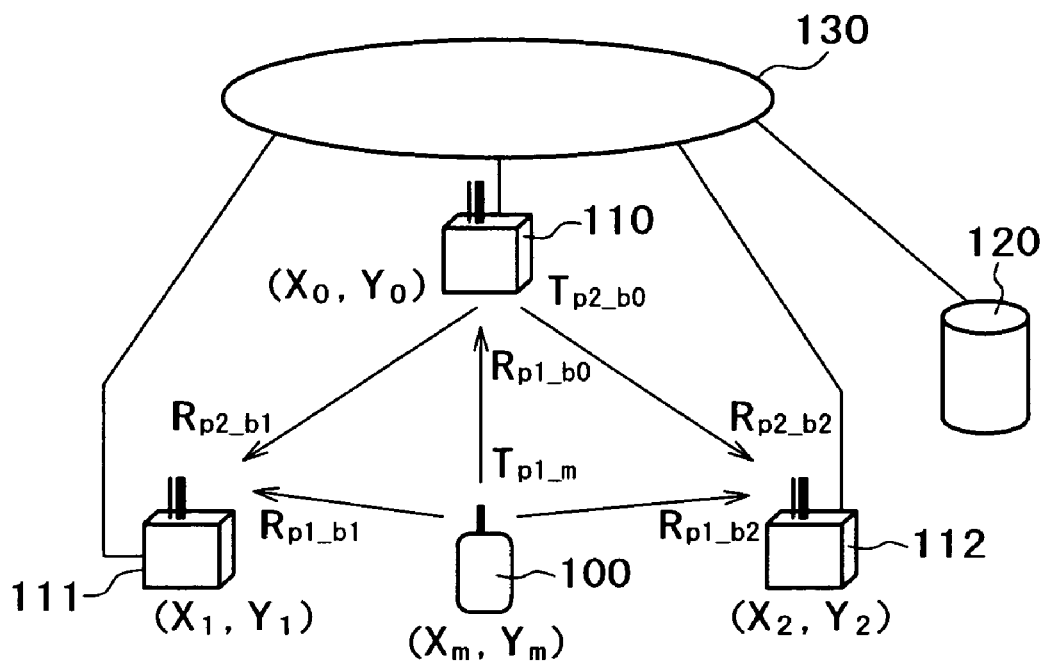
FIG. 1 is a block diagram of a wireless LAN system in the first embodiment of the invention.

Hereunder, a preferred embodiment of a wireless LAN system of the invention will be described with reference to FIG. 1. In FIG. 1, reference numerals are used as follows; 100 denotes a terminal, 110 to 112 denote base stations, 120 denotes a server, and 130 denotes a local area network (LAN) The terminal 100 has a function for sending a first wireless packet to each base station. Each of the base stations 110 to 112 has an internal clock and a function for measuring the receiving time of the first wireless packet received from the terminal 100. The reception timings measured by the clocks of the base stations 110 to 112 are defined as $R_{p1\_b0}$, $R_{p1\_b1}$, and $R_{p1\_b2}$. The distance between the terminal and each base station is known from the time on which the base station receives a signal from the terminal 100. The coordinates (position) of the terminal is known from this known distance. However, because the reception timings $R_{p1\_b0}$, $R_{p1\_b1}$, and $R_{p1\_b2}$ are measured in accordance with the clock specific to each of the base stations and the synchronization among the clocks of those base stations is not assured, each base station clock must be calibrated by detecting its clock time difference from the clocks of the other base stations.

The base station 110 has a function for sending a second wireless packet to the base stations 111 and 112 respectively and a function for measuring the transmission timing of the packet. The transmission timing measured by the clock of the base station 110 is defined as $T_{p2\_b0}$. The base station 110 transfers the reception timing $R_{p1\_b0}$ of the first wireless packet received from the terminal 100 and the transmission timing $T_{p2\_b0}$ of the second wireless packet from itself to the server 120. Each of the base stations 111 and 112 has a function for measuring the reception timing of the second wireless packet received from the base station 110. The reception timings measured by the clocks of the base stations 111 and 112 are defined as $R_{p2\_b1}$ and $R_{p2\_b2}$. Each of the base stations 111 and 112 transfers the reception timing $R_{p1\_b1}/R_{p1\_b2}$ of the first wireless packet received from the terminal 100 and the reception timing $R_{p2\_b1}/R_{p2/b2}$ of the second wireless packet received from the base station 110 to the server 120. The server 120 stores the coordinates (positions) $(X_0, Y_0)$, $(X_1, Y_1)$, and $(X_2, Y_2)$ of the base stations 110 to 112 beforehand and calculates the coordinates $(X_m, Y_m)$ of the terminal 100 according to the positions of the base stations 110 to 112 and the reception timings $R_{p1\_b0}$, $R_{p1\_b1}$, $R_{p1\_b2}$, $T_{p2\_b0}$, $R_{p2\_b1}$, and $R_{p2\_b2}$ of the base stations.

The distance between the base station 110 and each of the base stations 111 and 112 is already known, so the transfer time of the packet between the base stations is obtained by dividing the distance by light speed. Consequently, the reception timing at each of the base stations 111 and 112 (according to the clock of the base station 110) is obtained by adding the transfer time to the transmission timing from the base station 110. The clock time difference between base stations can thus be calibrated by detecting a difference between this reception timing and the reception timing measured by the clock of each of the base stations 111 and 112.

Next, a description will be made for a method for calculating the coordinates (position) of the terminal 100 in the server. Each of the base stations 110 to 112 has a clock. The coordinates ($X_m$, $Y_m$ (position)) of the terminal are obtained by solving the equation (i=1,2) shown in the expression 1. In the equation, "c" denotes the light speed, "$E_{b0\_b1}$(i=1, 2)" denotes a clock error of each of the base stations 111 and 112 with respect to the base station 110.

$$\{\sqrt{(X_m-X_i)^2+(Y_m-Y_i)^2} - \sqrt{(X_m-X_0)^2+(Y_m-Y_0)^2} = c(R_{p1\_bi} - E_{b0\_bi} - R_{pt\_b0})\} \quad \text{Expression 1}$$

Here, the position of the terminal will not be calculated if the clock of each of the base stations 111 and 112 includes a large error Eb0_b1 (i=1, 2) with respect to the base station 110. An error of one ms will cause an error of 300 m. However, those errors can be found by the expression 2 (i=1, 2) according to the measurement result of the second wireless packet sending/reception timing. In the expression 2 (i=1, 2), the right side (Rp2_bi=Tp2_b0) denotes an error of the second wireless packet reception timing in the base station 11$i$ (i=1, 2) with respect to the second wireless packet transmission timing in the base station 110. The third part of the right side denotes a transfer time between the base stations 110 and 11$i$ (i=1, 2).

$$E_{b0\_bi} = R_{p2\_bi} - T_{p2\_b0} - c^{-1}\sqrt{(X_1-X_0)^2+(Y_i-Y_0)^2} \quad \text{Expression 2}$$

By solving the expressions 1 and 2, locating of the position (coordinates: $X_m$, $Y_m$) of the terminal 100 is determined.

When positions of the terminal 100 are measured continuously, for example, in a navigation service, the clock error used in the past position measurement is used to calculate a clock error in the current position measurement. Consequently, the clock error comes to be detected more accurately. Hereinafter, the clock error calculated by Expression 2 in the current position measurement is defined as $E_{b0\_bi\_N}$(i=1,2), the clock error calculated by the expression 2 in the previous position measurement is defined as $E_{b0\_bi\_N-1}$, and the clock error calculated by the expression in the position measurement performed before L times is defined as $E_{b0\_bi\_N-L}$. In the current position measurement, the time on which the base station 11$i$(i=1,2) receives the second wireless packet is defined as $R_{p2\_bi\_N}$ and the time on which the base station 11$i$(i=1,2) receives the second wireless packet in the previous position measurement is defined as $Rp_{2\_Bi\_N-1}$, and the time on which the base station 11$i$(i=1,2) receives the second wireless packet in the position measurement before L times is defined as $R_{p2\_bi\_N-L}$. For example, a clock error of L=1, that is, the clock errors in the current and last position measurements are used, the clock error $E_{b0\_bi}$(i=1,2) needed in the expression 1 can be obtained by substituting t=$R_{p1\_bt}$ for the expression 7.

$$E_{b0\_bi} = \frac{t - R_{p2\_bi\_N-1}}{R_{p2\_bi\_N} - R_{p2\_bi\_N-1}} E_{b0\_bi\_N} + \frac{t - R_{p2\_bi\_N}}{R_{p2\_bi\_N-1} - R_{p2\_bi\_N}} E_{b0\_bi\_N-1} \quad \text{Expression 7}$$

Generally, if the clock errors in the current position measurement and the position measurements performed by L times in the past are used, the clock error $E_{b0\_bi}$(i=1,2) needed in the expression 1 can be obtained by substituting t=$R_{p1\_bi}$ for the L-order polynomial expression shown, for example, in the expression 8.

$$E_{b0\_bi} = \sum_{k=0}^{L}\left(E_{b0\_bi\_N-k}\prod_{\substack{m=0\\m\neq k}}^{L}\frac{t - R_{p2\_bi\_N-m}}{R_{p2\_bi\_N-k} - R_{p2\_bi\_N-m}}\right) \quad \text{Expression 8}$$

In addition, if the clock errors in the current position measurement and the position measurements performed L times in the past are used, the clock error $E_{b0\_bi}$(i=1,2) needed in the expression 1 can be obtained by substituting t=$R_{p1\_bi}$ for the approximation of a regression line shown in the expression 9.

$$E_{b0\_bi} = At + B \quad \text{Expression 9}$$

$$A = \frac{(L+1)\sum_{k=0}^{L} R_{p2\_bi\_N-k}E_{b0\_bi\_N-k} - \sum_{k=0}^{L} R_{p2\_bi\_N-k}\sum_{k=0}^{L} E_{b0\_bi\_N-k}}{(L+1)\sum_{k=0}^{L}(R_{p2\_bi\_N-k})^2 - \left(\sum_{k=0}^{L} R_{p2\_bi\_N-k}\right)^2}$$

$$B = \frac{\sum_{k=0}^{L} E_{b0\_bi\_N-k} - A\sum_{k=0}^{L} R_{p2\_bi\_N-k}}{L+1}$$

Next, the wireless LAN system in the second embodiment of the invention will be described with reference to FIG. 2. As described above, in the first embodiment shown in FIG. 1, the clock in each base station is calibrated by detecting its time difference from each of other base stations in a period of time. However, if the clock cycle differs among base stations due to the characteristics of the system itself and other conditions such as the ambient temperature, the clock difference among the base stations will change with time. In such a case, each base station clock should be calibrated by detecting its clock difference at a suitable time.

Figure 2:
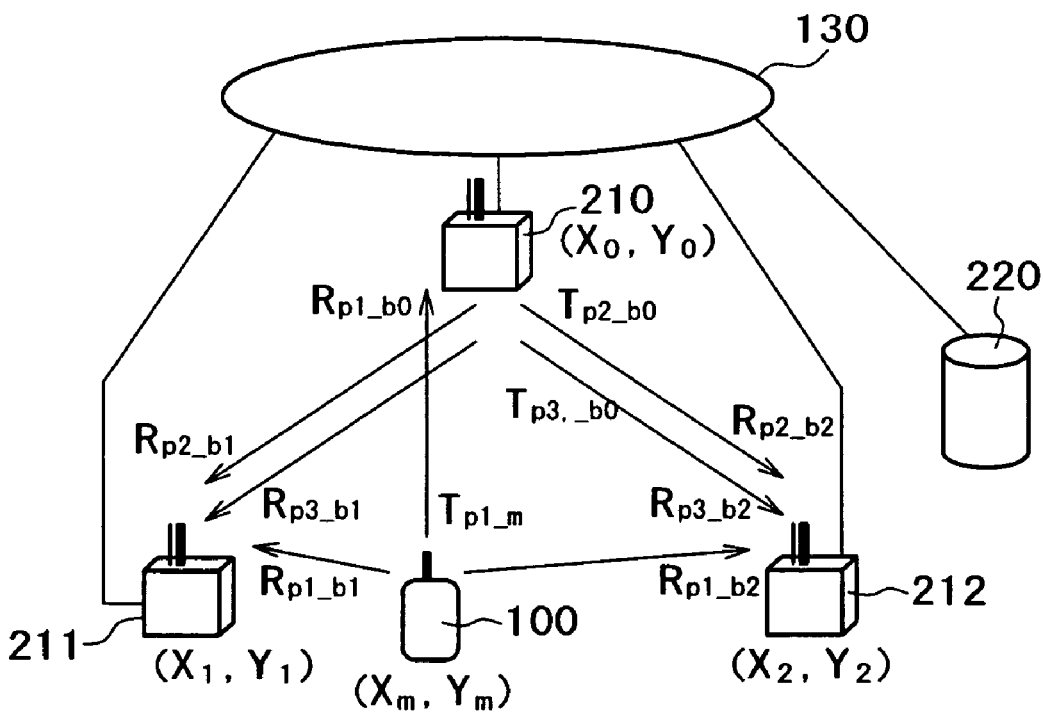
FIG. 2 is a block diagram of a wireless LAN system in the second embodiment of the invention.

In FIG. 2, reference numerals are used as follows; 100 denotes a terminal, 210 to 212 denote base stations, 220 denotes a server, and 130 denotes a local area network (LAN) The terminal 100 has a function for sending a first wireless packet to respective base stations. Each of the base stations 210 to 212 has an internal clock and a function for measuring the reception timing of the first wireless packet received from the terminal 100. The reception timings of the wireless packet at the base stations 210 to 212 are defined as $R_{p1\_b0}$, $R_{p1\_b1}$, and $R_{p1\_b2}$ at this time.

The base station 210 has a function for sending a second wireless packet to the base stations 211 and 212 respectively and a function for measuring the reception timing of the second wireless packet. The transmission timing of the second wireless packet measured by the clock of the base station 210 is defined as $T_{p2\_b0}$. The base station 210 has a function for sending a third wireless packet to the base stations 211 and 212 respectively and a function for measuring the transmission timing of the packet. The transmission timing of the third wireless packet measured by the clock of the base station 210 is defined as $T_{p3\_b0}$. The base station 210 transfers the reception timing $R_{p1\_b0}$ of the first wireless packet received from the terminal 100, the transmission timing $T_{p2\_b0}$ of the second wireless packet sent out from itself, and the transmission timing $T_{p3\_b0}$ of the third wireless packet sent out from itself to the server 220. The base station 210 may also send the second wireless packet earlier than the first wireless packet in this case. The base station 210 may also send the second and third wireless packets earlier than the first wireless packet.

The base stations 211 and 212 have a function for measuring the reception timing of the second wireless packet received from the base station 210 respectively. The reception timings of the second wireless packet measured by the clocks of the base stations 211 and 212 are defined as $R_{p2\_b1}$ and $R_{p2\_b2}$. Each of the base stations 211 and 212 has a function for measuring the reception timing of the third wireless packet received from the base station 210. The reception timings of the third wireless packet measured by the clocks of the base stations 211 and 212 are defined as $R_{p3\_b1}$ and $R_{p3\_b2}$. The base stations 211 and 212 transfer the reception timings $R_{p1\_b1}$ and $R_{p1\_b2}$ of the first wireless packet received from the terminal 100, the reception timings $R_{p2\_b1}$ and $R_{p2\_b2}$ of the second wireless packet received from the base station 210, and the reception timings $R_{p3\_b1}$ and $R_{p3\_b2}$ of the third wireless packet received from the base station 210 to the server 220 respectively.

The server 220 stores the positions (coordinates: $(X_0, Y_0)$, $(X_1, Y_1)$, and $(X_2, Y_2)$) of the base stations 210 to 212 beforehand to calculate the position $(X_m, Y_m)$ of the terminal 100 according to the positions of those base stations and the reception timings $Rp_{1\_b0}$, $R_{p1\_b1}$, $R_{p1\_b2}$, $T_{p2\_b0}$, $R_{p2\_b1}$, $R_{p2\_b2}$, $T_{p3\_b0}$, $R_{p3\_b1}$, and $R_{p3\_b2}$ obtained from the base stations 210 to 212.

Next, a method for calculating a position of the terminal 100 employed for the server 220 will be described.

Each of the base stations 210 to 212 has its own clock. The position (coordinates: $X_m, Y_m$) of the terminal 100 is obtained by solving the equation (i=1, 2) shown as the expression 1. Here, $E_{b0\_bi}$ (i=1, 2) denotes an error of the clock of each of the base station 211 and 212 with respect to the base station 210. If the clock speed varies among the base stations 210 to 212, the error $E_{b0\_bi}$ (i=1, 2) of each of the base stations 211 and 212 with respect to the base station 210 will change with time. Actually, in the case of the wireless LAN standard IEEE802.11, the clock accuracy is tolerated within ±25 ppm, so that the error between base stations might increase by 50 ms per second in maximum. A time error of 50 ms will cause a distance error of 15000 m. However, the error can be found by the expression 3 (i=1,2) according to the measurement results of the sending and reception timings of the second and third wireless packets. In the expression 3 (i=1,2), the $(T_{p3\_b0}-T_{p2\_b0})/(R_{p3\_bi}-R_{p2\_bi})$ enclosed by the parentheses of the right side denotes a ratio of the clock speed of the base station 210 to the clock speed of the base station 21$i$ (i=1,2). The $(R_{p2\_bi}-R_{p1\_bi})$ of the right side denotes an error of the reception timing of the second wireless packet with respect to the reception timing of the first wireless packet in the base station 21$i$ (i=1,2). Multiplying the $(R_{p2\_bi}-R_{p1\_bi})$ by $(T_{p3\_b0}-T_{p2\_b0})/(R_{p3\_bi}-R_{p2\_bi})$, the error of the second wireless packet reception timing with respect to the first wireless packet reception timing in the base station 21$i$ (i=1,2) can be compensated by the clock speed of the base station 210 to obtain a compensated value. Consequently, the value enclosed by the parentheses of the right side takes a value obtained by compensating the second wireless packet reception timing in the base station 21$i$ (i=1,2) by the clock speed of the base station 210. The expression 3 is an expanded one from the expression 2. If the clock speed is the same between base stations $(T_{p3\_b0}-T_{p2\_b0})/(R_{p3\_bi}-R_{p2\_bi})$, the compensated value becomes 1, so that the expression 3 matches with the expression 2.

$$E_{b0\_bi} = \left\{ R_{p1\_bi} + \frac{T_{p3\_b0} - T_{p2\_b0}}{R_{p3\_bi} - R_{p2\_bi}} (R_{p2\_bi} - R_{p1\_bi}) \right\} - T_{p2\_b0} - c^{-1}\sqrt{(X_i - X_0)^2 + (Y_i - Y_0)^2}$$

Expression 3

Consequently, the position (coordinates: $X_m, Y_m$) of the terminal 100 is located by solving the expressions 1 and 3.

Next, the wireless LAN system in the third embodiment of the invention will be described with reference to FIG. 9. In the embodiments shown in FIGS. 1 and 2, at least one base station is provided with a function for measuring the transmission timing of each packet to detect a clock difference among base stations. In this third embodiment, however, no base station is provided with the function.

Figure 9:
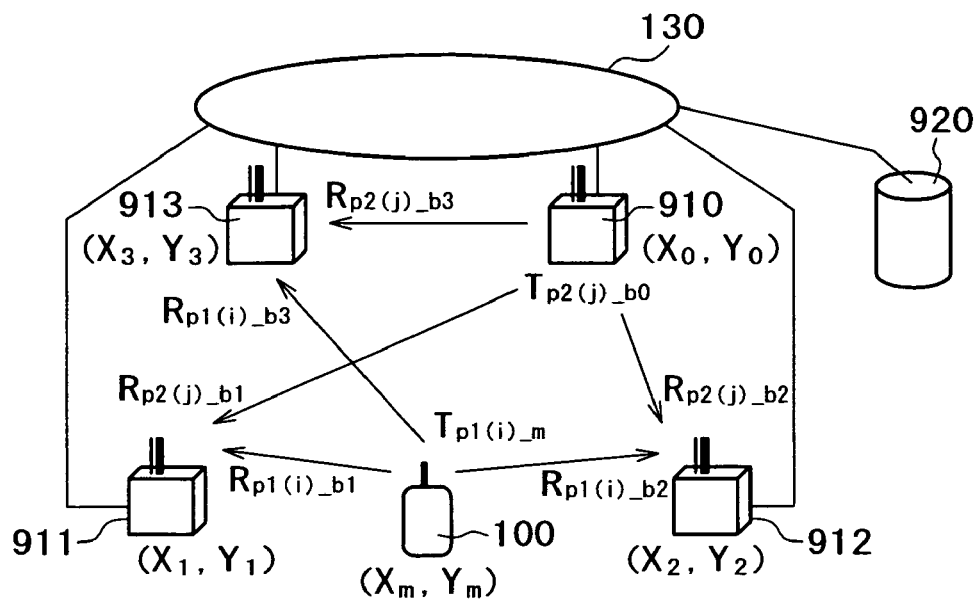
FIG. 9 is a block diagram of a wireless LAN system in the third embodiment of the invention.

In FIG. 9, the reference numerals are used as follows; 100 denotes a terminal, 910 to 913 denote base stations, 920 denotes a server, and 130 denotes a local area network (LAN). The terminal 100 has a function for sending a first wireless packet to respective base stations. Each of the base stations 911 to 913 has an internal clock and a function for measuring the reception timing of the first wireless packet received from the terminal 100. The reception timings of the wireless packet measured by the clocks of the base stations 911 to 913 are defined as $R_{p1(i)\_b1}$, $R_{p1(i)\_b2}$, and $R_{p1(i)\_b3}$ at this time.

The base station 910 has a function for sending a second wireless packet to the base stations 911 and 913 respectively. The base station 910 may also have a function for sending the third wireless packet to those base stations. The base station 910 may also have a function for sending the second wireless packet earlier than the first wireless packet. The base station 910 may also send the second and third wireless packets earlier than the first wireless packet.

Each of the base stations 911, 912, and 913 has a function for measuring the reception timing of the second wireless packet received from the base station 910. The reception timings of the second wireless packet measured by the clocks of the base stations 911 and 913 are defined as $R_{p2(j)\_b1}$, $R_{p2(j)\_b2}$, and $R_{p2(j)\_b3}$ (j=2). Each of the base stations 911 and 913 may also have a function for measuring the reception timing of the third wireless packet received from the base station 910. The reception timings of the third wireless packet measured by the clocks of the base stations 911 and 913 are defined as $R_{p2(j)\_b1}$, $R_{p2(j)\_b2}$, and $R_{p2(j)\_b3}$ (j=3). The base stations 911 and 913 transfer the reception timings $R_{p1(j)\_b1}$, $R_{p1(j)\_b2}$, and $R_{p1(j)\_b3}$ (j=1) of the first wireless packet received from the terminal 100 respectively, the reception timings $R_{p2(j)\_b1}$, $R_{p2(j)\_b2}$, and $R_{p2(j)\_b3}$ (j=2) of the second wireless packet received from the base station 910 respectively, and further the reception timings $R_{p2(j)\_b1}$, $R_{p2(j)\_b2}$, and $R_{p2(j)\_b3}$ (j=3) of the third wireless packet received from the base station 910 as needed to the server 920 respectively.

The server 920 stores the positions (coordinates: $(X_0, Y_0)$, $(X_1, Y_1)$, $(X_2, Y_2)$, and $(X_3, Y_3)$) of the base stations 910 to 913 beforehand to calculate the position $(X_m, Y_m)$ of the terminal 100 according to the positions of those base stations and the reception timings $R_{p1(j)\_b1}$, $R_{p1(j)\_b2}$, $R_{p1(j)\_b3}$, $R_{p2(j)\_b1}$, $R_{p2(j)\_b2}$, $R_{p2(j)\_b3}$ obtained from the base stations 910 to 913.

Next, a method for calculating the position of the terminal 100 employed for the server 920 will be described.

Each of the base stations 911 to 913 has its own clock. The position (coordinates: $X_m$, $Y_m$) of the terminal 100 is obtained by solving the equation (k=2,3) shown in the expression 4. Here, $E_{b1\_bk}$ (k=2,3) denotes an error of the clock of each of the base station 912 and 913 with respect to the base station 911. However, the error can be found by the expression 5 (k=2,3, j=2) according to the measurement results of the reception timings of the second wireless packet.

$$\{\sqrt{(X_m-X_k)^2+(Y_m-Y_k)^2} - \sqrt{(X_m-X_1)^2+(Y_m-Y_1)^2}\} = c(R_{p1(i)\_bk}-E_{b1\_bk}-R_{p1(i)\_b1}) \quad \text{Expression 4}$$

$$E_{b1\_bk} = R_{p2(j)\_bk} - R_{p2(j)\_b1} - c^{-1}\{\sqrt{(X_k-X_0)^2} - \sqrt{(X_1-X_0)^2+(Y_k-Y_0)^2}\} \quad \text{Expression 5}$$

Also in this embodiment, the clock error obtained by the expression 5 in the current position measurement and the clock errors obtained by the expression 5 in the position measurements performed L times in the past may be used to obtain the clock error $E_{b1\_bk}$ to be used in the expression 4 just like in the first embodiment. Concretely, the methods shown in the expressions 7 to 9 in the first embodiment may be used.

In the case where the clock speed varies among the base stations 911 to 913 and the error $E_{b1\_bk}$ (k=2,3) of the clock of each of the base stations 912 and 913 changes with time with respect to the clock of the base station 911, the measurement result of the reception timing of the third wireless packet may be used to find the error using the expression 6 (k=2,3, j=2, h=3).

$$E_{b1\_bk} = \frac{R_{p2(h)\_b1}R_{p2(j)\_bk} - R_{p2(h)\_bk}R_{p2(j)\_b1}}{R_{p2(h)\_bk} - R_{p2(j)\_bk}} - $$
$$c^{-1}\left\{\sqrt{(X_k-X_0)^2+(Y_k-Y_0)^2} - \sqrt{(X_1-X_0)^2+(Y_1-Y_0)^2}\right\} + $$
$$\left(1 - \frac{R_{p2(h)\_b1} - R_{p2(j)\_b1}}{R_{p2(h)\_bk} - R_{p2(j)\_bk}}\right)R_{p1(i)\_bk} \quad \text{Expression 6}$$

In the expression 6 (k=2,3, j=2, h=3), the $(R_{p2(h)\_b1}-R_{p2(j)\_b1})/(R_{p2(h)\_bk}-R_{p2(j)\_bk})$ enclosed by the parentheses of the right side denotes a ratio of the clock speed of the base station 911 to the clock speed of the base station 91k (k=2,3). The expression 6 is an expanded one from the expression 5. When the clock error $E_{b1\_bk}$ (k=2,3) does not change with time, that is, when the clock speed ratio is 1, the expression 6 matches with the expression 5. At this time, the measurement results of the reception timings of the second and third wireless packets are insufficient to find the clock error $E_{b1bk}$ (k=2,3). In such a case, the measurement results of the reception timings of the second, third, and g-th (g≧4) wireless packets may be used to find the error. In this connection, the $E_{b1\_bk}$ (k=2,3) may be decided according to a plurality of clock errors obtained by the expression 6 (k=2,3, j=e, h=f, e≠f, e≧2, f≧3), for example, by averaging the plurality of clock errors obtained by the expression 6.

Consequently, the position (coordinates: $X_m$, $Y_m$) of the terminal 100 is located by solving the expressions 4 and 5 or 4 and 6.

In this third embodiment, three base stations are used to calculate the two-dimensional position of the terminal 100 to simplify the description. However, the number of base stations used for the calculation is not limited only to three; N base stations (N≧4) may be used. In this connection, expressions 1 to 3 may be used as (i=1,2, . . . N-1). Expressions 4 to 6 may be used as (k=1,2, . . . N). The equation in the expression 1 or 4 can be solved by, for example, the least square method. The "position calculating method and position calculating apparatus" disclosed in JP-A No.236163/2002 may also be used to calculate the position of the terminal 100 more accurately. The method for calculating the two-dimensional position of the terminal 100 is also included in the invention. In this connection, the z coordinate is added to the expressions 1 to 3 with respect to the N base stations (N≧4) to form the expressions as (i=1,2, . . . , N-1) or the z coordinate is added to the expressions 4 to 6 to form the expressions as (k=1,2, . . . , N).

Next, a description will be made for a system flowchart for detecting a position of the terminal with reference to FIG. 3. At first, the terminal requests detection of its position to the server through the connectable base station 310. Usually, the base station 310 is the nearest base station of the terminal. The server, if the frequency channel used to detect the terminal position must be changed, instructs the terminal to change the channel. Thus, the terminal changes the frequency channel. After that, the server instructs the base station 310 that has transferred the request from the terminal and the base stations 311 and 312 positioned near the base station 310 to monitor the frequency channel. The server, which stores the positions of those base stations 310 to 312 beforehand, can identify the base stations (311 and 312) around one base station (310) easily. Each of the base stations instructed to monitor the frequency channel responds with a monitoring result. The server then requests the terminal to send a first wireless packet to the frequency channel through the base station 310 that has transferred the request from the terminal. The terminal thus sends the first wireless packet to the frequency channel. Each of the base stations instructed to monitor the frequency channel measures its reception timing of the packet. The base station 310, after receiving the first wireless packet, sends a second wireless packet to the base stations 311 and 312 respectively through the frequency channel at a fixed interval. The base station measures the transmission timings. The base stations 311 and 312 measure the reception timing of the second wireless packet respectively. If the clock speed differs significantly among those base stations at this time, the base station 310 may send a third wireless packet to the base stations 311 and 312 respectively through the frequency channel at a fixed interval after sending the second wireless packet to them. In this connection, the base station 310 measures its transmission timing while the base stations 311 and 312 measure their reception timing of the third wireless packet respectively. Each of the base stations 311 and 312 sends the measurement result of the wireless packet receiving or transmission timing to the server. The server then calculates the position of the terminal using the method described above and reports the result to the terminal.

If a unique code is set in each of the first to third wireless packets, each base station will be able to distinguish the first/second/third packet from others easily when in measuring of the reception timing.

Next, a description will be made for another system flowchart for detecting a position of the terminal with reference to FIG. 8. At first, the terminal requests detection of its position to the server through the base station 310, which is the nearest to the terminal. The server then instructs the base station 310 that has transferred the request from the terminal, as well as the base stations 311 and 312 around the base station 310 to monitor the frequency channel used for locating the terminal position. The server, which stores the positions (coordinates) of those base stations beforehand, can find the base stations positioned around one base station easily. Each of the base stations 310 to 312 instructed to monitor the frequency channel returns the monitoring result to the server. After that, the server requests the terminal to send a first wireless packet to the frequency channel through the base station 310. At this time, the base station 310 comes to send the packet to the frequency channel. This packet is assumed as the second wireless packet and the base station 310 measures its transmission timing. Each of the base stations 311 and 312 positioned around the base station 310 measures their reception timing of the second wireless packet. The terminal then sends the first wireless packet to the frequency channel. Each of the base stations 310 to 312 instructed to monitor the frequency channel thus measures its reception timing of the packet. If the clock speed differs significantly among the base stations at this time, the base station 310 may send a third wireless packet to the base stations 311 and 312 through the frequency channel at a fixed interval after receiving the first wireless packet. In this connection, the base station 310 measures its transmission timing while the base stations 311 and 312 measure the third wireless packet reception timing respectively. Each of the base stations then sends the measured receiving or transmission timing to the server. The server then calculates the position of the terminal using the method described above and reports the result to the terminal as the detected position.

Figure 11:
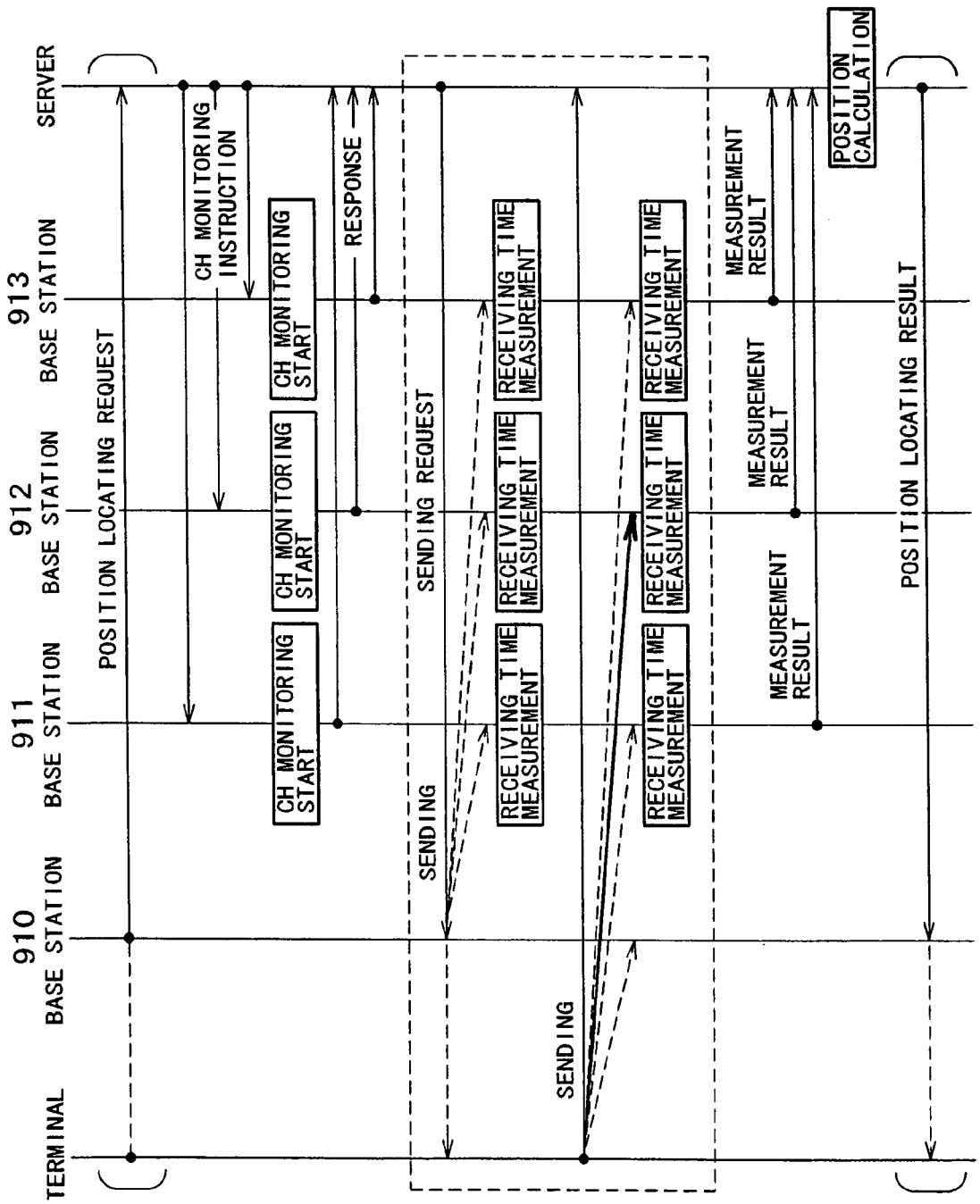
FIG. 11 is another system flowchart for position locating according to the invention.

Next, a description will be made for a system flowchart for locating a position of the terminal by a server in the wireless LAN system shown in FIG. 9 with reference to FIG. 11. At first, the server instructs the base stations 911 to 913 to monitor the frequency channel used for locating the terminal position. Each of the base stations 911 to 913 instructed to monitor the frequency channel returns the monitoring result to the server. The server then requests the terminal via the base station 910 to send a first wireless packet to the frequency channel. At this time, the base station 910 comes to send the packet to the frequency channel. This packet then becomes a second wireless packet. Each of the base stations 911 to 913 measures its reception timing of the second wireless packet. After that, the terminal sends the first wireless packet to the frequency channel. Each of the base stations 911 to 913 instructed to monitor the frequency channel thus measures its reception timing of the first wireless packet. If the clock speed differs significantly among the base stations at this time, the server may further request the terminal to send the first wireless packet to the frequency channel again through the base station 910. In other words, the processings enclosed by a dotted line in FIG. 11 may be repeated. At this time, the base station 910 comes to send the wireless packet to the frequency channel again. This packet then becomes a third wireless packet. Each of the base stations 911 to 913 thus measures its reception timing of the third wireless packet. After the measurement, each base station sends the result to the server. The server then calculates the position of the terminal using the calculating method described above.

Figure 3:
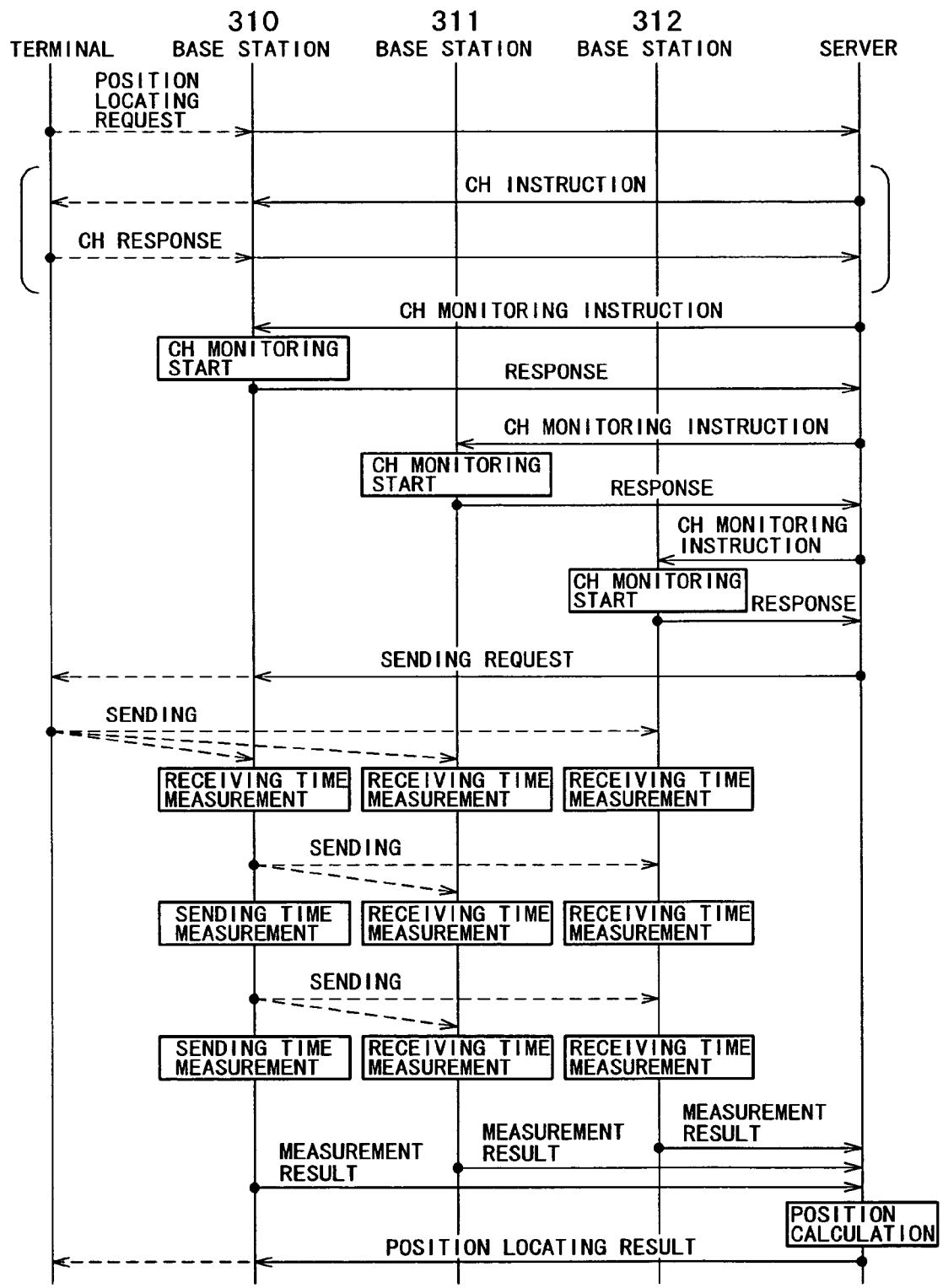
FIG. 3 is a system flowchart of position locating according to the invention.
Figure 8:
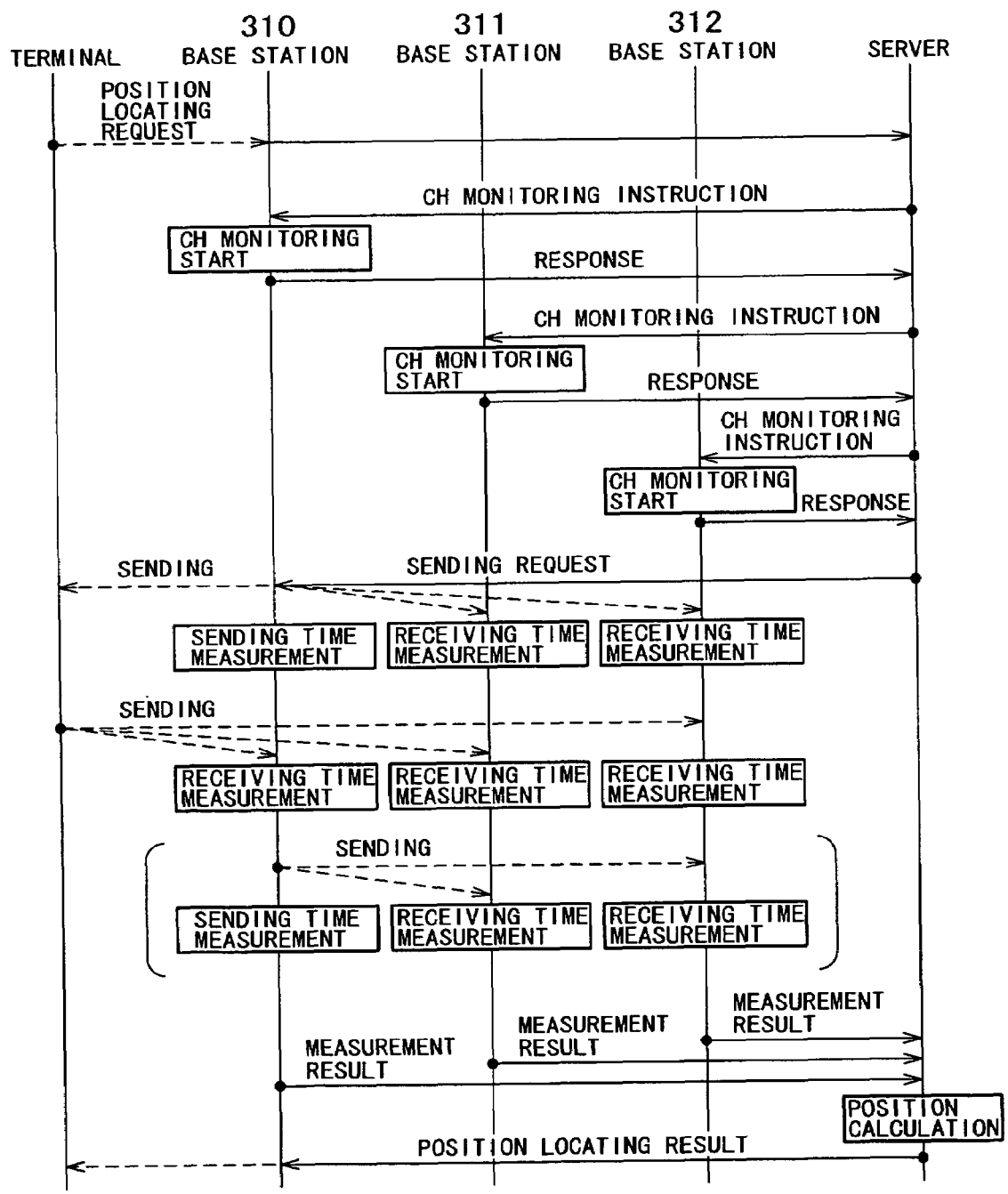
FIG. 8 is a system flowchart for position locating according to the invention.

In this case, it is also possible to add processings performed by the terminal to request the server to detect its position through the base station 910 first and the server to report the detection result to the terminal finally as shown in the flowcharts in FIGS. 3 and 8.

Next, a description will be made for a method for controlling a frequency channel in the wireless LAN system of the invention with reference to FIGS. 5 and 6. The wireless LAN system usually uses a plurality of frequency channels. As described above, in order to realize multiple casting of a clock calibrating packet, a common frequency channel should be used among all the base stations related to the above-described terminal position locating.

Figure 5:
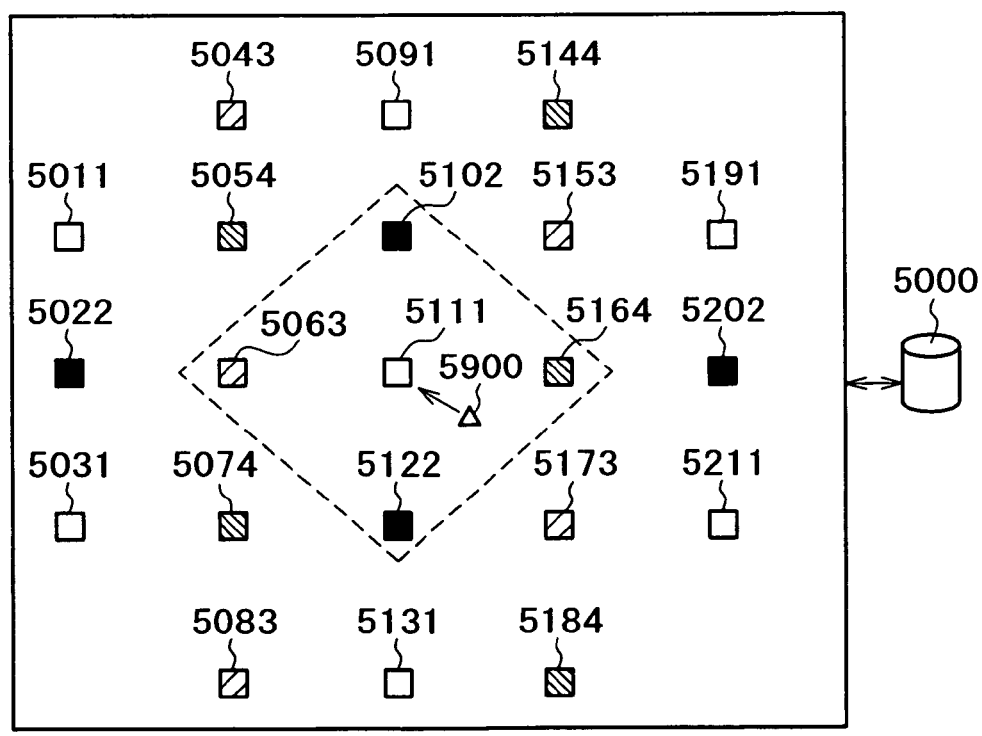
FIG. 5 is a flat view for describing a method for controlling a frequency channel according to the invention.

FIG. 5 shows a chart for describing the common frequency channel controlling method of the invention. FIG. 6 shows a flowchart of the frequency channel controlling method of the invention. In FIG. 5, reference numerals are used as follows; 5000 denotes a server, 5900 denotes a terminal, and 501* to 521* (*: any of 1 to 4) denote base stations. In the example shown in FIG. 5, four types of frequency channels are assigned to those base stations 501* to 521* and the last one digit of each base station number denotes the assigned frequency channel. For example, No.1 frequency channel is assigned to the base station 5111 and No.4 frequency channel is assigned to the base station 5164.

Assume that the terminal 5900 requests the server 5000 to detect its position through the base station 5111. The server 5000 then selects four base stations 5063, 5102, 5122, and 5164 positioned around the base station 5111, so that a total of five base stations including the base station 5111 are used for the terminal position locating (step 601 in FIG. 6).

Figure 6:
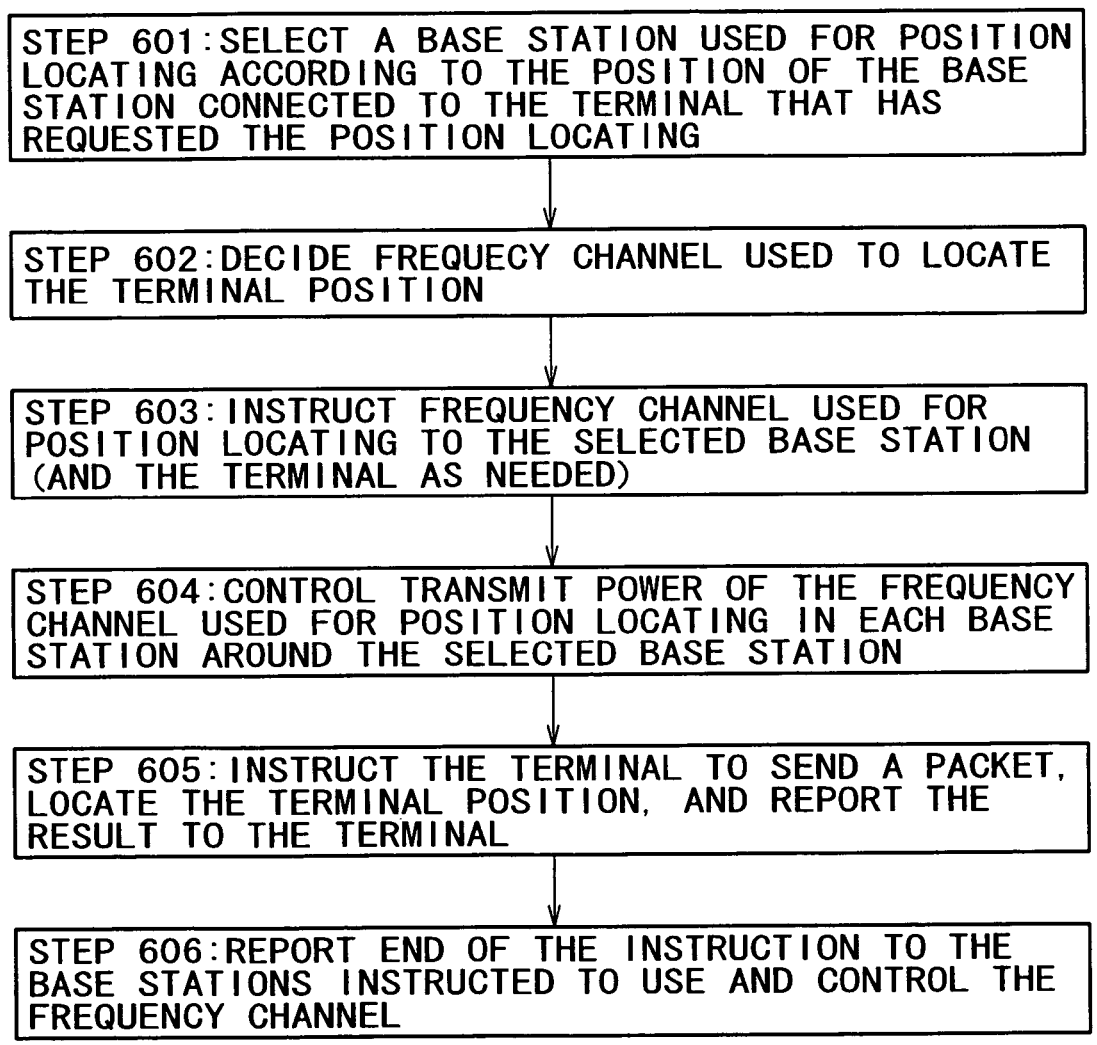
FIG. 6 is a flowchart of the processings by the frequency channel controlling method of the invention.

After that, the server 5000 decides the frequency channel used for the terminal position locating (step 602 in FIG. 6). The frequency channel deciding method may be, for example, a method for selecting the frequency channel (No.1 in FIG. 5) of the terminal that has requested the position locating as the frequency channel for locating the terminal position. The frequency channel (No.2 in FIG. 5) may be the most frequently assigned one among the selected base stations.

The server 5000 instructs the base stations 5063, 5102, 5122, 5164, and 5111, as well as the terminal 5900 as needed, to use the decided frequency channel for the terminal position locating (step 603 in FIG. 6). Note that the server 5000 may also instructs the base stations around the base stations 5063, 5102, 5122, 5164, and 5111 used for the position locating to stop the use of the frequency channel decided so as to suppress the interference from signals at the time of position locating; or that the server may also control so as to reduce the transmission power in the frequency channel (step 604 in FIG. 6). For example, if No.2 frequency channel is selected in FIG. 5, the frequency channel is assigned to the base stations 5022 and 5202. Therefore, the server 5000 instructs those base stations 5022 and 5202 to stop the use of the frequency channel.

The server 5000 then locates the terminal position and reports the locating result to the terminal 5900 (step 605 in FIG. 6). After that, the server 5000 instructs the base stations 5063, 5102, 5122, 5164, and 5111 to restore their frequency channels. The server 5000 also cancels the instruction for controlling the transmission power in the frequency channel issued to the base stations 5022 and 5202 (step 606 in FIG. 6).

Figure 4:
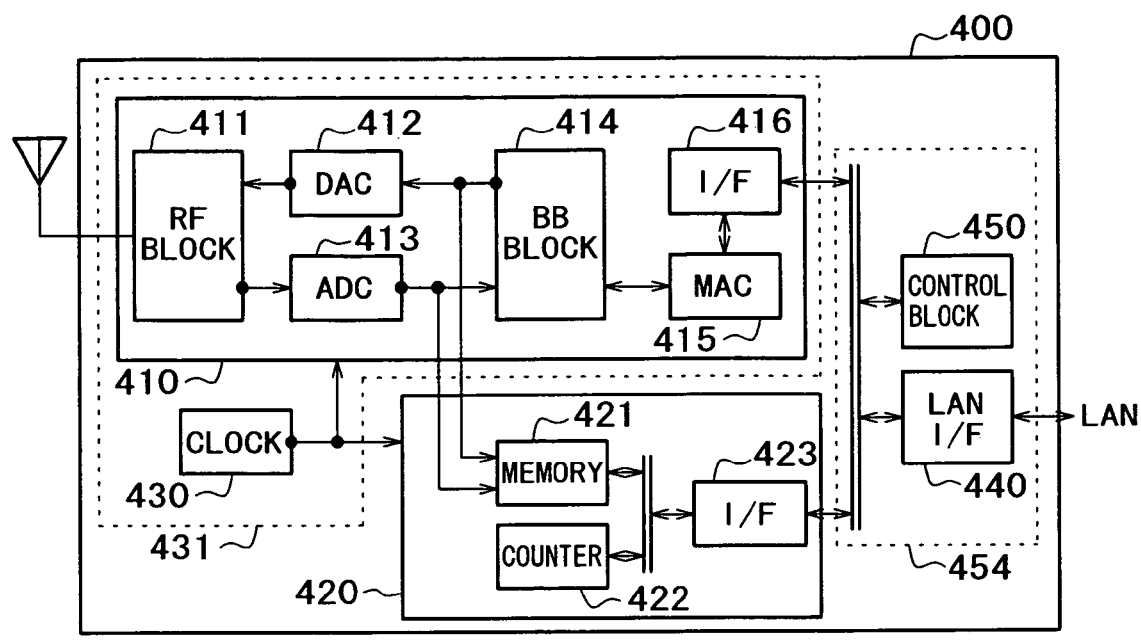
FIG. 4 is a block diagram of a base station of the invention.

Next, a description will be made for a configuration of the base station employed for the LAN system of the invention with reference to FIG. 4. In FIG. 4, the base station 400 is configured by a communication block 410, a storage block 420, a clock 430, a LAN I/F block 440, and a control block 450.

The communication block 410 is configured by an RF block 411, a DAC (Digital to Analog Converter) 412, an ADC (Analog to Digital converter) 413, a BB block 414, a MAC block 415, and an I/F block 416. The RF block 411 converts the baseband signals inputted from the DAC 412 to high-frequency radio signals and outputs the converted signals to the antenna. The RF block 411 converts the high-frequency radio signals received from the antenna to baseband signals and outputs the converted signals to the ADC 413. The DAC 412 converts the digital baseband signals (I/Q) to analog baseband signals (I/Q).

The ADC 413 converts analog baseband signals (I/Q) to digital baseband signals (I/Q). The BB block 414 receives MPDU (MAC Protocol Data Units) from the MAC block 415 to generate baseband signals to be output to the DAC 412. The BB block 414 demodulates the baseband signals inputted from the ADC 413 to obtain the MPDU (MAC Protocol Data Units) to be output to the MAC block 415. The MAC block 415 controls the communications with other stations in accordance with the MAC (Media Access Control) protocol. The I/F block 416 sends/receives data to/from devices provided outside the communication block and enables the external devices to control the communication block 410.

The storage block 420 is configured by a memory 421, a counter 422, and an I/F block 423. The memory 421 is instructed by the I/F block 423 to fetch the baseband signals (I/Q) received from the communication block 410 synchronously with the clock 430. The memory 421 is also instructed by the I/F block 423 to fetch the baseband signals (I/Q) sent from the communication block 410 synchronously with the clock 430. The counter 422 counts the time (counter value) synchronously with the clock 430. In addition, the counter is instructed by the I/F block 423 to record the start or end of fetching each of the baseband signals written/read in/from the memory 421. The I/F block 423 enables devices provided outside the storage block 420 to read the memory/counter and to control the storage block 420.

outside the storage block 420 to read the memory/counter and to control the storage block 420.

The clock 430 supplies a common clock to both of the communication block 410 and the storage block 420 so that both blocks synchronize with each other.

The LAN I/F block 440 is an interface block used for a local area network.

The control block 450 controls the communication block 410 and the LAN I/F block 440 and intermediates the communication between the terminal and the LAN. The control block 450 controls the LAN I/F 440 to communicate with the server. In addition, the control block 450 controls the communication block 410 and the storage block 420 to calculate the sending or reception timing of each wireless packet.

Figure 10:
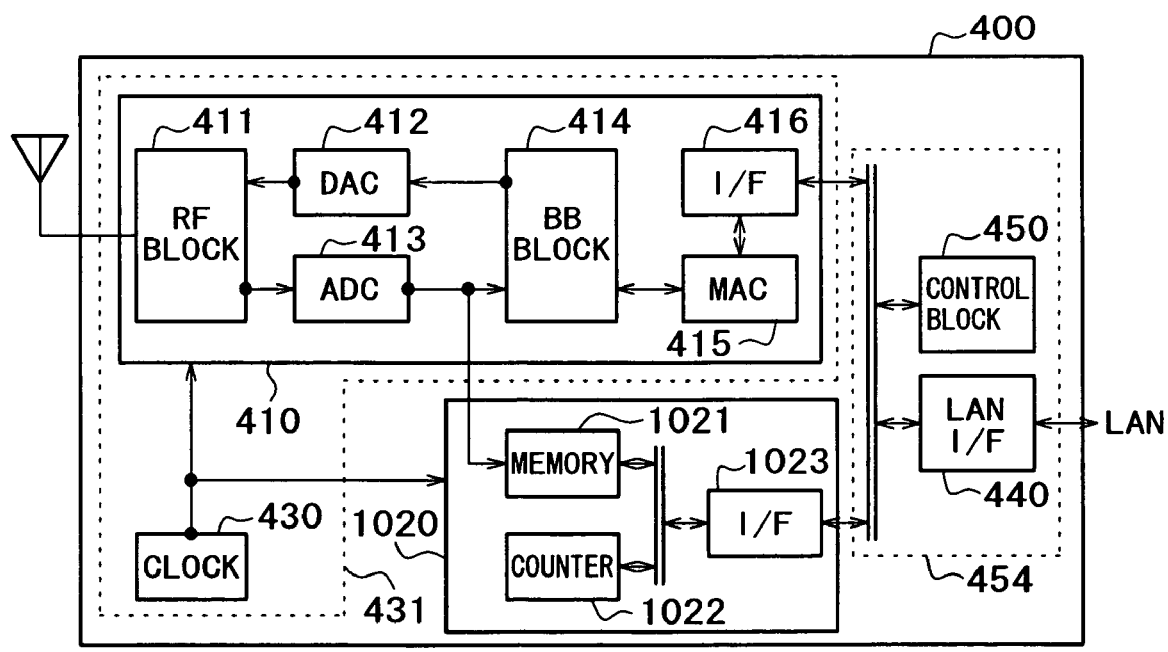
FIG. 10 is another block diagram of the base station of the invention.

Next, a description will be made for a configuration of the base station employed in the third embodiment of the wireless LAN system shown in FIG. 9 with reference to FIG. 10. The storage block 1020 is only a different item in the configuration shown in FIG. 10; all other items are equivalent to those in the configuration shown in FIG. 4. Therefore, only the difference (storage block 1020) will be described here.

The storage block 1020 is configured by a memory 1021, a counter 1022, and an I/F block 1023. The memory 1021 is instructed by the I/F block 1023 to fetch the baseband signals (I/Q) received from the communication block 410 synchronously with the clock 430. The counter 1022 counts the time (counter value) synchronously with the clock 430.

In addition, the counter 1022 is instructed by the I/F block 1023 to record the start or end of fetching of each of the baseband signals written/read in/from the memory 1021. The I/F block 1023 enables devices provided outside the storage block 1020 to read the memory/counter and to control the storage block 1020.

Unlike the base station configuration shown in FIG. 4, the function for measuring the transmission timing of each packet is omitted from the configuration in this embodiment. The reception timing of each wireless packet can be found by the peak position of a correlation value obtained from the cross correlation between each of the received baseband signals stored in the memory 421 or 1021 and a known signal sequence (ex., a preamble synchronization field pattern included in the received packet PLCP (Physical Layer Convergence Protocol) preamble), as well as a time (ex., fetching starting time) required for fetching a received baseband signal recorded in the counter 422 or 1022. At this time, a processing delay between an input to the antenna end and an output from the ADC is included. Therefore, if this delay time is measured beforehand and compensated according to the measurement result, the reception timing will become more accurate. In this case, however, it is not necessarily required to find the reception timing of each wireless packet in each base station; the server may calculate the reception timing according to the received baseband signal fetched in the memory and the time required to fetch the signal transferred respectively thereto.

The transmission timing of a wireless packet can be calculated, for example, according to a position at which the level of a transmit baseband signal stored in the memory 421 changes and a time (ex., a fetching starting time) required to fetch a transmit baseband signal recorded in the counter 422 easily. In addition, just like the reception timing, it is possible to calculate the transmission timing according to the peak position of a correlation value obtained from a cross correlation between a transmit baseband signal stored in the memory 421 and a known signal sequence (ex., a preamble synchronization field pattern included in the transmit packet PLCP (Physical Layer Convergence Protocol) preamble) and a time required to fetch a transmit baseband recorded in the counter 422. In any case, because a processing delay between an input to the DAC and an output from the antenna end is not included, the transmission timing can be obtained more accurately if this delay time is estimated beforehand and this delay is compensated by the measured time. In this connection, however, the server is not necessarily required to find the transmission timing of each wireless packet in each base station; the server may calculate the reception timing according to the transmit baseband signal fetched in the memory and the time required to fetch the signal, both of which are transferred to the server respectively.

To calculate the receiving or transmission timing of the above wireless packet, for example, the "ranging and locating a position using a spectrum diffuse signal and an apparatus that employs the method" disclosed in JP-A No.14152/2002 can apply.

In the base station 400, a wireless LAN card can apply to a circuit 431 that includes the communication block 410 and a clock 430. A PC that includes the program included in the base station flowchart shown in FIG. 8 or 11 in itself can apply to the circuit 454 that includes the control block 450 and the LAN I/F 440.

The server in this system can use a PC that includes a program used in the server flowchart shown in FIG. 3 or 8 or FIGS. 11 and 6. The terminal in this system can use a notebook PC and/or PDA that includes a program shown in the terminal flowchart shown in FIG. 3 or 8 or 11.

FIG. 7 shows a data format of the information related to each base station. The information is stored in the server. In FIG. 7, each of the base station information items 1, 2, . . . , n is an information unit related to one base station. The ID number described in each base station information identifies the base station that has the subject information. In addition to such an ID number, each base station information includes items of location, frequency channel number, sending delay time, and receiving delay time. The location denotes a position of a base station identified by an ID number with coordinates. The frequency channel number denotes a frequency channel number assigned to a base station identified by the ID number. Both sending and receiving delay times denote sending and receiving delay times of a base station identified by the ID number. These delay times are used to measure both sending and reception timings of a base station more accurately.

A method for synchronizing base stations with each other in the above wireless LAN system is an application of the invention.

For example, in the embodiment of the wireless LAN system shown in FIG. 1, if the server 120 transfers a clock error $E_{b0\_bi}$ (i=1,2) calculated in the expression 2 to the base stations 111 and 112 respectively and the base stations 111 and 112 compensate the clock error respectively, the base stations 111 and 112 can be synchronized with the base station 110 respectively.

Furthermore, in the embodiment of the wireless LAN system shown in FIG. 2, the base stations 211 and 212 can be synchronized with the base station 210 if the server 220 transfers the clock error $E_{p0\_bi}$(i=1,2) calculated in the expression 3 and the ratio $(T_{p3\_b0}-T_{p2\_b0})/(R_{p3\_bi}-R_{p2\_bi})$ (i=1,2) of the clock speed of the base station 210 to the clock of each of the base stations 211 and 212 in the expression 3 and the each of the base stations 211 and 212 goes back to the time $R_{p1\_bi}$(i=1,2) on which the first wireless packet is received to compensate the clock error $E_{b0\_bi}$ (i=1,2) and keeps the compensation its own clock according to the ratio between clock speeds after that time on.

Similarly, in the embodiment of the wireless LAN system shown in FIG. 9, the base stations 912 and 913 can be synchronized with the base station 911 if the server 920 transfers the clock error $E_{b1\_bk}$(k=2,3) calculated in the expression 6, as well as the ratio $(R_{p2(h)\_b1}-R_{p2(i)\_b1})/(R_{p2(h)\_bk}-R_{p2(j)\_bk})$ (k=2,3, j=2, h=3) of the clock speed of the base station 911 to the clock of each of the base stations 912 and 913 in the expression 6 and each of the base stations 912 and 913 goes back to the time $R_{p1(i)\_bk}$(k=2,3) on which the first wireless packet is received to compensate the clock error $E_{p1\_bk}$(k=2,3) and keeps the compensation of its own clock according to the ratio $(R_{p2(h)\_b1}-R_{p2(i)\_b1})/(R_{p2(h)\_bk}-R_{p2(j)\_bk})$ (k=2,3, j=2, h=3) between the clock speeds after that time on.

In the above-described embodiments of the invention, wireless LAN signals have been used for ranging. The wireless LAN signals are used in wider ranges than the GPS signals. For example, the bandwidth employed by the IEEE802.11b, which is one of the wireless LAN standards, is 22 MHz, which is wider than the GPS bandwidth 2 MHz. Because of the wide bandwidth, the signal time resolution becomes high, thereby the terminal position can be located more accurately than the GPS signals.

According to the embodiments of the invention, therefore, there is no need to provide the terminal with any device such as a GPS receiver to detect a position of the terminal, since the terminal uses only the already existing function for sending wireless packets. Thus, both cost and size of the terminal can be reduced.

In the case of the position locating method that employs the TDOA (Time Difference Of Arrival) in the embodiments of the invention, the method is required to include a function for measuring the reception timing of each wireless packet from the terminal and a function for synchronizing the base stations with each other. However, the invention realizes both of those functions with a common function for measuring the receiving or transmission timing of each wireless packet in each base station, so that both cost and size of the terminal are reduced due to the employed common function. In addition, according to the method described in the third embodiment of the invention, the function for measuring the transmission timing of each wireless packet in each base station can be omitted, thereby the cost is more reduced. Because there is no need to synchronize base stations with each other actually and only a clock difference among the base stations is detected, there is no need to stop the operation of each base station for the synchronization.

Even when the clock accuracy varies among base stations and the clock error changes with time in those base stations, the second embodiment of the invention is effective to suppress the degradation of the locating accuracy to be caused by a clock error.

If both sending and receiving delay times in each base station are decided beforehand, both sending and reception timings of each wireless packet can be measured more accurately. If the transmission power in the frequency channel selected for position locating is controlled so as to be reduced in each of the base stations positioned around the base station selected for position locating, the interference by signals can be reduced, thereby the wireless packet reception timing measurement accuracy is more improved and the position locating accuracy is improved.

Furthermore, according to the embodiments of the invention, it is possible to synchronize base stations with each other at a time accuracy equally to the position locating accuracy.

According to the invention, therefore, a position of a terminal can be located very accurately without using any additional devices such as a GPS receiver in a wireless LAN system.

System And Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Figure 12:
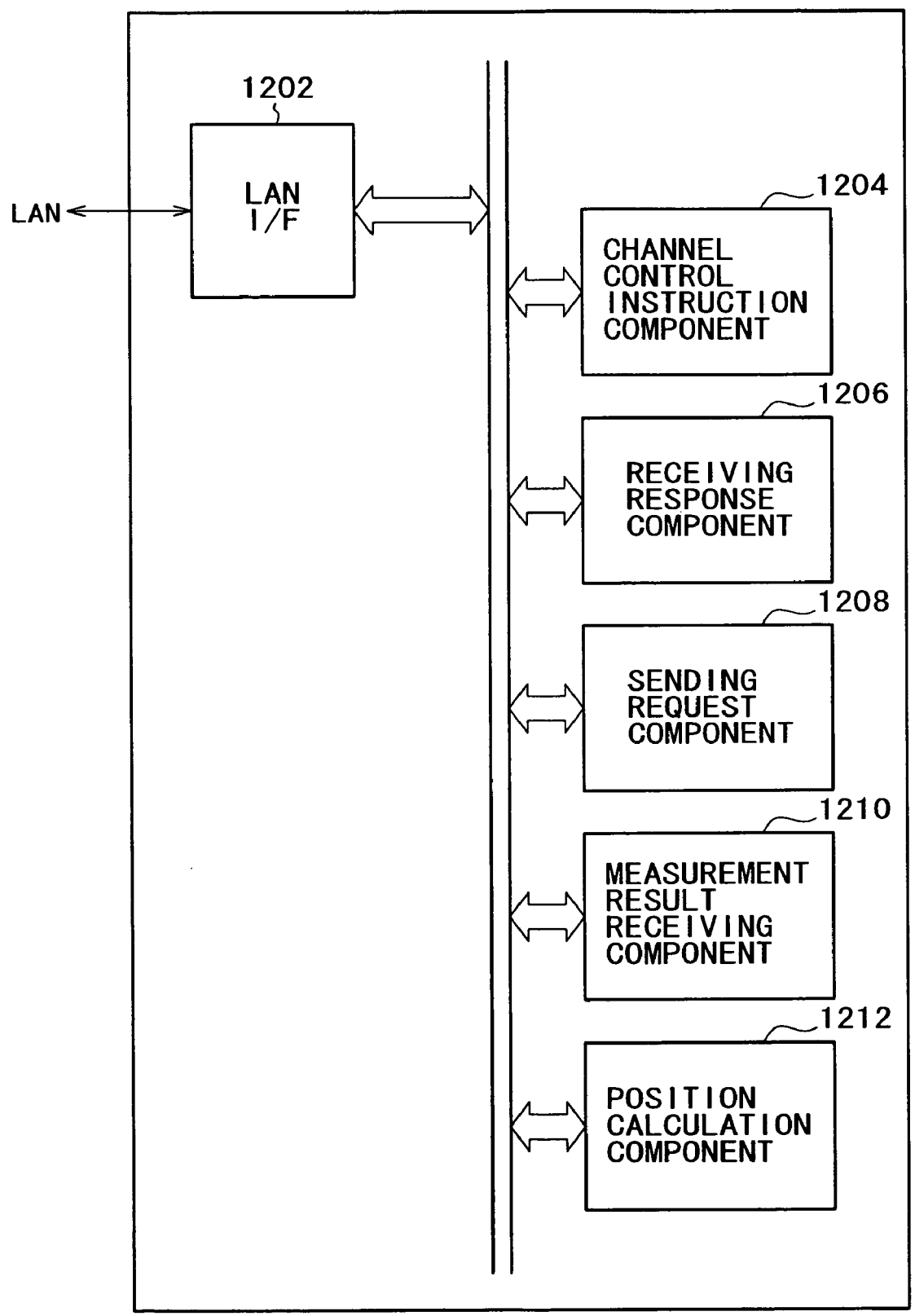
FIG. 12 is a block of a server that may be used with position locating methods of the present invention.

FIG. 12 is a block of a server that may be used with terminal position locating methods of the present invention. The server includes components, each component being made up of software, hardware, or a combination thereof.

For explanatory purposes, consider the server of FIG. 12 in the context of the method discussed above with reference to FIG. 11. Note that the server of FIG. 12 is not limited to the method of FIG. 11, and other position location methods may be used with the server. In accordance with FIG. 11, a local area network interface (LAN I/F) 1202 is an interface that allows the server to communicate with LAN devices, including base stations, terminals, and other servers. A channel control instruction component 1204 may be configured to instruct base stations 911 to 913 to monitor the frequency channel used for locating the terminal position. A receiving response component 1206 may be configured to receive monitor results from the base stations instructed to monitor the frequency channel. A sending request component 1208 may be configured to send a request through the base station 910 to the terminal, requesting the terminal to send a first wireless packet. The sending request component may be further configured to send the request for the terminal to send the first wireless packet again as needed. A measurement result receiving component 1210 may be configured to receive a measurement result from each base station. A position calculation component 1212 may be configured to calculate the position of the terminal using the calculating method described above.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating a position of a base station, detecting a clock time difference between the base station and another base station, measuring a reception timing of a signal received by the base station from the terminal, and locating the position of the terminal using at least the position of the base station, the clock time difference, and the reception timing, according to processes of the present invention.

OTHER ADDITIONAL EMBODIMENTS

The present invention includes, but is not limited to, the following additional embodiments.

A wireless communication system is provided that comprises a first base station having a first clock and known coordinates; and a second base station having a second clock and known coordinates, wherein the first and second base stations measure their reception timings of a first signal received from the terminal using their own clocks respectively, wherein the second base station measures its reception timing of a second signal received from the first base station using the second clock, wherein the system detects a clock time difference between the first and second clocks according to the coordinates of the first and second base stations, a transmission timing of the second signal measured by the first clock, and a reception timing of the second signal measured by the second clock, and wherein the system locates the position of the terminal according to the first signal reception timing measured by the first clock, the first signal reception timing measured by the second clock, and the detected time difference.

The wireless communication system may further comprise a third base station having a third clock and known coordinates, wherein the third base station measures its reception timing of the first signal received from the terminal using the third clock, wherein the system detects a time difference between the first and third clocks according to the coordinates of the first and third base stations, a transmission timing of the second signal measured by the third clock, and a reception timing of the second signal measured by the third clock, wherein the system locates the position of the terminal according to the reception timing of the first signal measured by the first clock, the reception timing of the first signal measured by the second clock, the reception timing of the first signal measured by the third clock, and the detected time difference.

The wireless communication system may be further configured to control at least the first to third base stations so that the same communication channel is used among the first to third base stations in the locating of the terminal position.

A base station is provided that is configured by a communication block, a storage block, a clock, a processing block, and a LAN I/F block, wherein a sending/reception timing of each wireless packet is detected according to a base band signal (I/Q) stored in the storage block and a time related to the storing operation.

The base station may be further configured such that the reception timing of each wireless packet is detected according to a received base band signal (I/Q) stored in the storage block, a cross-correlation with a predetermined complex signal vector, and a storing operation-related time.

A wireless communication system is provided that comprises a plurality of base stations, a plurality of communication channels, and a terminal, wherein the system sets a common communication channel for at least a first base station having a first clock and known coordinates, a second base station having a second clock and known coordinates, and a third base station having a third clock and known coordinates, the first to third base stations being included in the plurality of base stations, wherein each of the first to third base stations has a first measuring block for measuring a reception timing of a first signal received from the terminal using its own clock, wherein each of the second and third base stations has a second measuring block for measuring a reception timing of a second signal received from the first base station using its own clock, and wherein the system locates a position of the terminal according to the coordinates of the first to third base stations, the transmission timing of the second signal measured by the first clock, the reception timing of the second signal measured by the second clock, the reception timing of the second signal measured by the third clock, the reception timing of the first signal measured by the first clock, the reception timing of the first signal measured by the second clock, and the reception timing of the first signal measured by the third clock.

The wireless communication system may be further configured to control the transmission power in each base station that uses the same communication channel, which are other than the base stations for which the common communication channel is set.

A server is provided for a system that comprises a plurality of base stations; a plurality of communication channels; and a terminal, wherein a first base station having a first clock and known coordinates, a second base station having a second clock and known coordinates, and a third base station having a third clock and known coordinates measure their reception timings of a first signal received from the terminal using their own clocks, the first to third base stations being included among the plurality of base stations, wherein the second and third base stations measure their reception timings of the second signal received from the first base station using their own clocks, wherein the server sets a common communication channel for the first to third base stations, and wherein the server locates a position of the terminal according to the coordinates of the first to third base stations, the transmission timing of the second signal measured by the first clock, the reception timing of the second signal measured by the second clock, the reception timing of the second signal measured by the third clock, the reception timing of the first signal measured by the first clock, the reception timing of the first signal measured by the second clock, and the reception timing of the first signal measured by the third clock.

A wireless communication system is provided that comprises a plurality of base stations; a plurality of communication channels; and a terminal, wherein the system sets a common communication channel for at least a first base station having known coordinates, a second base station having a second clock and known coordinates, a third base station having a third clock and known coordinates, and a fourth base station having a fourth clock and known coordinates, the first to fourth base stations being included in the plurality of base stations, wherein each of the second to fourth base stations has a first measuring block for measuring a reception timing of a first signal received from the terminal using its own clock, wherein each of the second to fourth base stations has a second measuring block for measuring a reception timing of a second signal received from the first base station using its own clock, and wherein the system locates the position of the terminal according to the coordinates of the first to fourth base stations, the reception timing of the second signal measured by the second clock, the reception timing of the second signal measured by the third clock, the reception timing of the second signal measured by the fourth clock, the reception timing of the first signal measured by the second clock, the reception timing of the first signal measured by the third clock, and the reception timing of the first signal measured by the fourth clock.

A server is provided for a system that comprises a plurality of base stations; a plurality of communication channels; and a terminal, wherein a first base station having known coordinates, a second base station having a second clock and known coordinates, a third base station having a third clock and known coordinates, and a fourth base station having a fourth clock and known coordinates measure their reception timings of a first signal received from the terminal using their own clocks, the first to fourth base stations being included in the plurality of base stations, wherein the second to fourth base stations measure their reception timings of a second signal received from the first base station using their own clocks, wherein the server sets a common communication channel for the first to fourth base stations and locates a position of the terminal according to the coordinates of the first to fourth base stations, the reception timing of the second signal measured by the second clock, the reception timing of the second signal measured by the third clock, the reception timing of the second signal measured by the fourth clock, the reception timing of the first signal measured by the second clock, the reception timing of the first signal measured by the third clock, and the reception timing of the first signal measured by the fourth clock.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for locating a position of a terminal, the method comprising:
   measuring reception timings of plural second signals sent out from a one base station at other base stations using their each clock,
   measuring reception timings of a first signal sent out from a terminal at the other base stations using their each clock,
   determining relations of clock speeds among the other base stations, according to both coordinates of the one and the other base stations and reception timings of said plural second signals measured by the other base stations,
   adjusting clock errors included in the reception timings of a first signal sent out from a terminal based on the relations of clock speeds among the other base stations,
   locating the position of the terminal according to said adjusted reception timings of the first signal sent out from the terminal and the coordinates of the other base stations.

2. A method of claim 1, wherein a frequency channel is used to measure the reception timings of a signal received from the terminal and to detect the relations of clock speeds among the other base stations.

3. A method of claim 1, wherein the first and second signals are wireless signals.

4. A method of claim 3, wherein the first signal received by the other base stations from the terminal is transmitted in response to reception, at the terminal, of the second signal transmitted from the base station to detect the clock time difference.

5. A server for locating a position of a terminal, the server comprising:
   means for receiving measured reception timings of a second signal sent out from a one base station at other base stations using their each clock,
   means for receiving measured reception timings of a first signal sent out from a terminal at the other base stations using their each clock,
   means for determining relations of clock speeds among the other base stations, according to both coordinates of the one and the other base stations and reception timings of said plural second signals measured by the other base stations,
   means for adjusting clock errors included in the reception timings of a first signal sent out from a terminal based on the relations of clock speeds among the other base stations, means for locating the position of the terminal according to said adjusted reception timings of the first signal sent out from the terminal and the coordinates of the other base stations.

6. A server of claim 5, further comprising a channel control instruction component configured to instruct the other base stations to monitor a frequency channel used for location the position of the terminal.

7. A server of claim 6, further comprising means for controlling transmission power, for the frequency channel, of base stations not used for locating the position of the terminal, according to the base station used for locating the position of the terminal and the frequency channel.

* * * * *